Aug. 26, 1952 E. TOMUSKO 2,608,329
MACHINE FOR DRYING AND BAGGING FROZEN CONFECTIONS
Filed June 4, 1948 3 Sheets-Sheet 1

INVENTOR.
Edward Tomusko
BY
McMorrow, Berman & Davidson
ATTORNEYS

Aug. 26, 1952 E. TOMUSKO 2,608,329
MACHINE FOR DRYING AND BAGGING FROZEN CONFECTIONS
Filed June 4, 1948 3 Sheets-Sheet 2
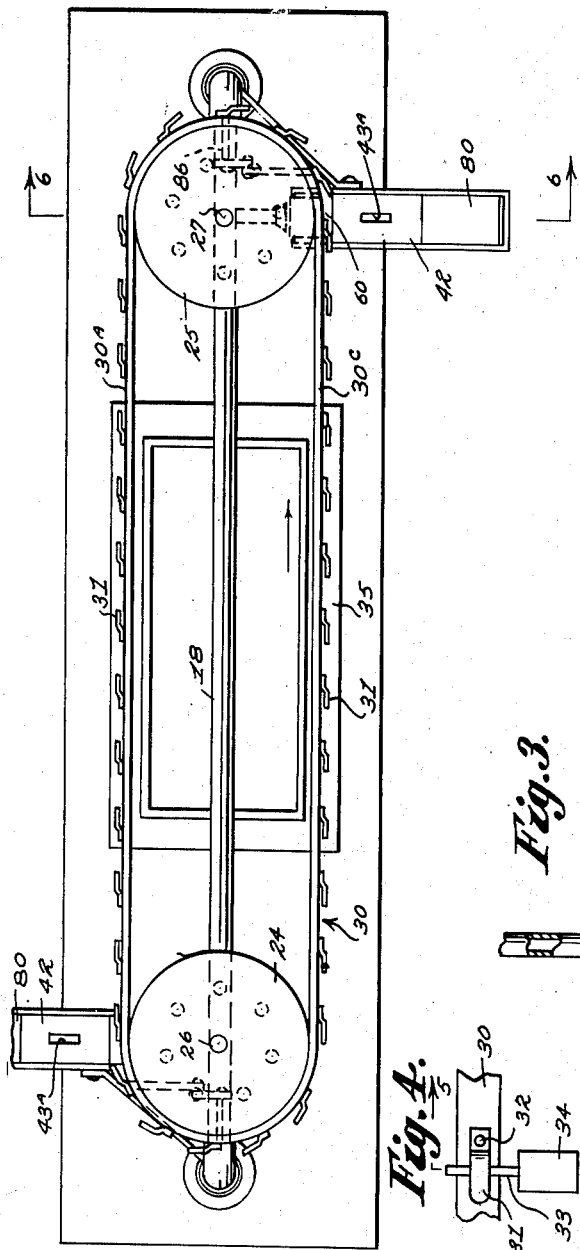
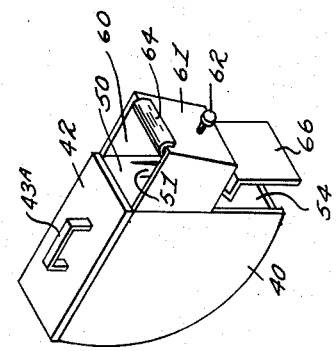
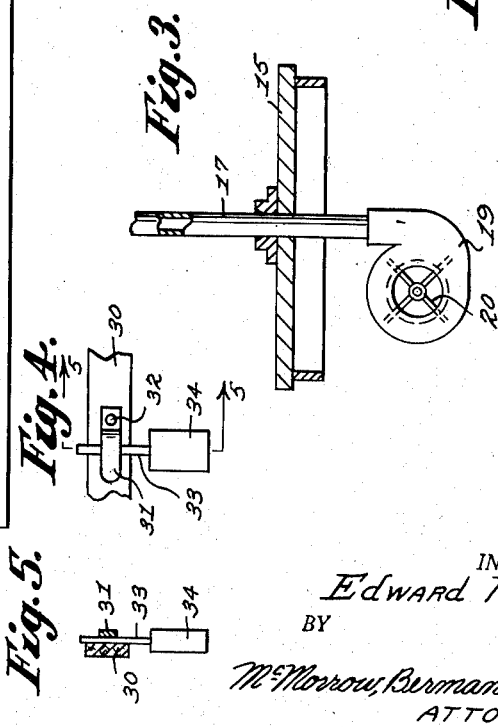
INVENTOR.
Edward Tomusko
BY
McMorrow, Berman & Davidson
ATTORNEYS Aug. 26, 1952 E. TOMUSKO 2,608,329
MACHINE FOR DRYING AND BAGGING FROZEN CONFECTIONS
Filed June 4, 1948 3 Sheets-Sheet 3
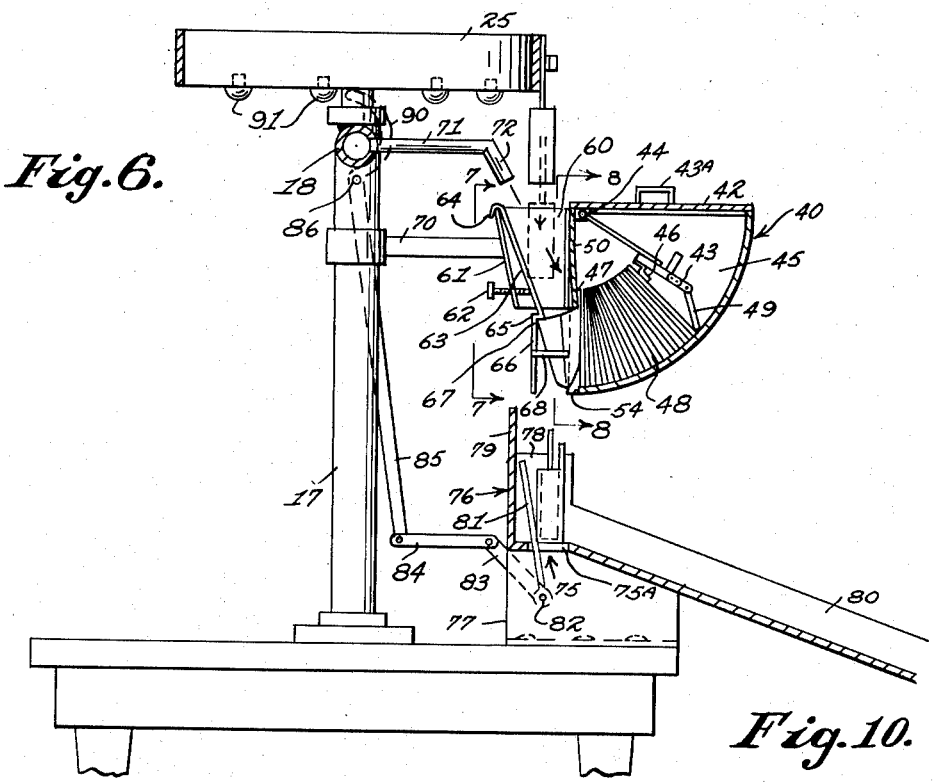
Fig. 6.
Fig. 10.
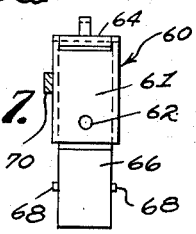
Fig. 7. Fig. 8.
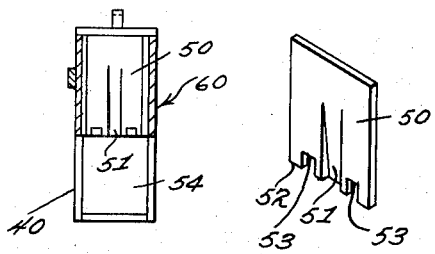
Fig. 9.
Fig. 11.
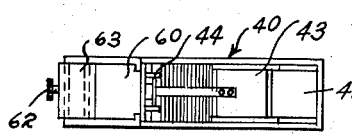
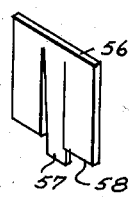
Fig. 12.
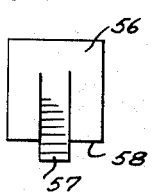
INVENTOR.
Edward Tomusko
BY
McMorrow, Berman & Davidson
ATTORNEYS Patented Aug. 26, 1952

2,608,329

UNITED STATES PATENT OFFICE 2,608,329

MACHINE FOR DRYING AND BAGGING FROZEN CONFECTIONS

Edward Tomusko, Cleveland, Ohio

Application June 4, 1948, Serial No. 31,064

2 Claims. (Cl. 226—2)

This invention relates to a machine for drying and bagging frozen confection on sticks.

An object of the invention is the provision of a machine in which a belt trained on pulleys and equipped with clips has two parallel sections moving in straight paths, sticks supplied with a frozen confection freshly coated with a chocolate confection being carried along the straight path by the clip until the belt curves around the pulley whence the sticks are released automatically for descent into a hopper after which the frozen confections fall into bags expanded by air pressure.

A further object of the invention is the provision of a machine for not only drying chocolate-coated congealed confections mounted on sticks but for placing the dried frozen confections in bags which are shifted across the path of the confections and which have been inflated by blasts of air, the freshly-coated confections being carried along a horizontal path during the drying operation and discharged downwardly at the end of said path, said confections being directed into the open ends of the bags which are shifted automatically and successively across the downward path, the blasts of air being supplied by nozzles in communication with a pipe forming an air conduit and a support for the drying apparatus.

This invention is best understood from a consideration of the following detailed description in connection with the accompanying drawings, nevertheless, it is to be understood that the invention is not confined to the disclosure but is susceptible of such changes and modifications as shall define no material departure from the salient features of the invention as expressed in the appended claims.

In the drawings:

Figure 2 is a top plan view of the machine.

Figure 3 is a transverse section of the table showing a device for supplying air to inflate bags for the reception of the dry-coated frozen confections.

Figure 4 is a fragmentary enlarged view in elevation of a clip on a belt for holding a stick attached to a frozen confection.

Figure 5 is a vertical section taken along the line 5—5 of Figure 4.

Figure 6 is a transverse vertical section of the machine taken along the line 6—6 of Figure 2.

Figure 7 is a vertical section taken along the line 7—7 of Figure 6.

Figure 8 is a vertical section taken along the line 8—8 of Figure 6.

Figure 9 is a top plan view of a bag dispenser.

Figure 10 is a view in perspective of a dispensing plate when certain types of bags are used.

Figure 11 is a view in perspective of a modified form of dispensing plate for another type of bag.

Figure 12 is a rear view of the plate shown in Figure 11.

Figure 13 is a view in perspective of the bag dispenser shown in Figure 9.

Figure 1:
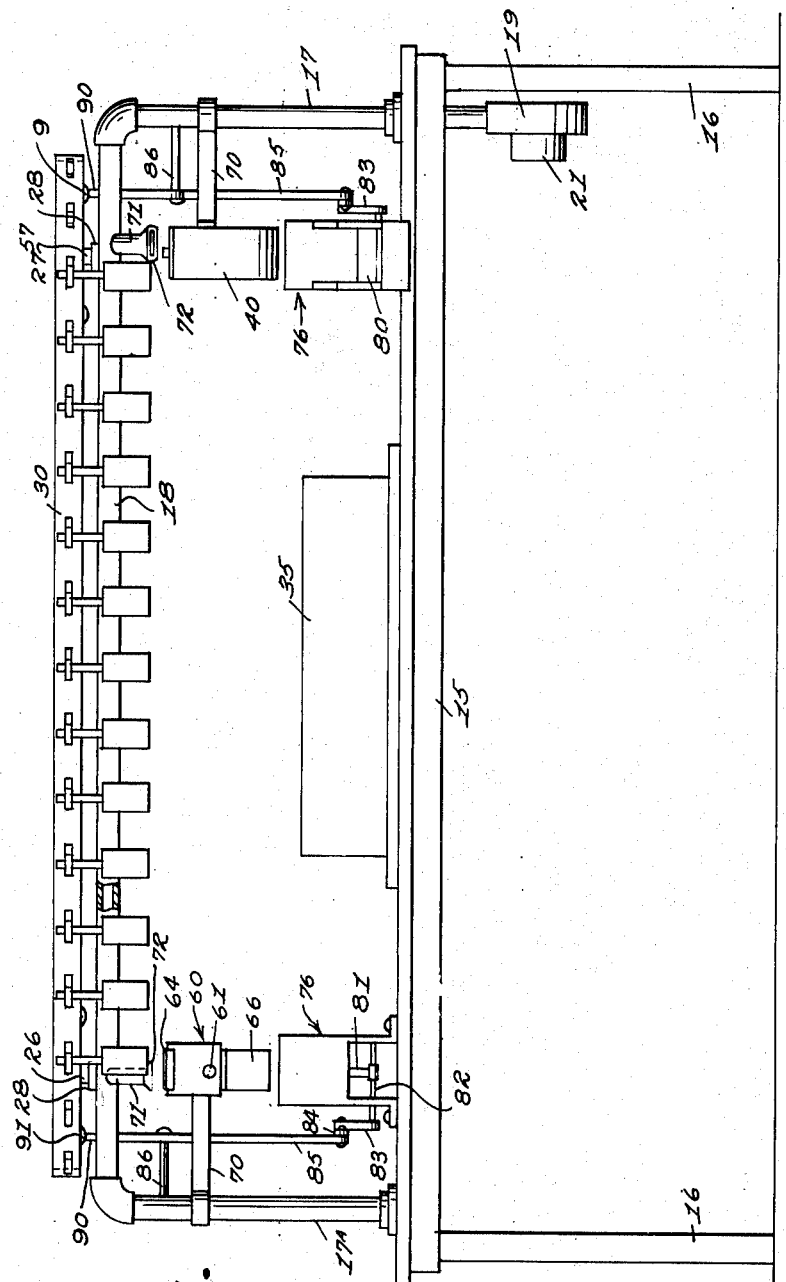
Figure 1 is a side view in elevation of my machine for drying and bagging chocolate-coated frozen confections.

Referring more particularly to the drawings, 15 designates a table mounted on legs 16. Vertical pipes 17 and 17a rise from the ends of the table with the upper ends thereof joined by a horizontal pipe 18 disposed centrally and longitudinally of said table. These pipes not only form a conduit for air but provide a support for drying apparatus to be described presently. One vertical pipe 17 extends downwardly through the table 15 and is connected to a blower casing 19 (Figure 3). A fan 20 mounted in the casing is driven by a motor 21 which together with the fan and casing form a unit. The fan forms a common source for forcing air through the pipe 17, pipe 18 and nozzles, about to be described. The lower end of pipe 17a is closed. Thus, in effect the pipe 18 acts as a manifold.

A pair of spaced pulleys 24 and 25 are secured to shafts 26 and 27, respectively (Figure 2). The shafts have bearings 28 carried by the horizontal pipe 18. A belt 30 is trained on the pulleys to provide two long parallel sections 30a and 30c at each side of the table 15. Spring clips 31 have one end (Figure 4) secured at 32 to the belt in spaced relation thereby providing a free end between which and the outer surface of the belt, sticks 33 are inserted as the belt is operated. A frozen confection 34 attached to and depending from the stick is dipped into a pan 35 containing a chocolate-coating for the confection. The coating dries when traveling along the straight paths as defined by the parallel sections of the belt. However, when the belt starts to move around the curved surfaces of the pulleys 24 and 25, the free ends of the clips move outwardly from the belt and release the sticks for a purpose which will be described presently.

A bag dispenser includes a housing 40 which has a curved bottom 41 and an open top closed by a cover 42 having a handle 43a (Figures 6, 9 and 13). A weight 43 is hingedly mounted at 44 on the inner portion of the magazine 45 of the dispenser. This weight has a projection 46 which presses against the usual closure flaps 47 of bags 48 stored in the magazine. A portion 49 of the weight presses against the lower ends of said bags (Figure 6) where said bags ride over the inner curved surface of the bottom 41 of the magazine.

A plate 50 (Figure 10) of particular construction is substantially rectangular in shape and has an integral tongue 51 projecting rearwardly from the bottom edge 52 of said plate. A notch 53 is formed in the bottom edge at each side of the tongue. The plate is located at the inner vertical face of the magazine with the lower edge 52 in a position for the lower end of the tongue 51 to contact the closure flaps 47 of the bags 48. The portion of the inner vertical face of magazine below the bottom edge 52 of the plate 50 is open to provide a discharge passage 54 for the bags. The plate 50 is employed for certain types of bags and the lower free end of the tongue 51 is substantially in line with the bottom edge 52 of the plate.

A modified form of plate is shown at 56 in Figures 11 and 12. In this form which is employed for a different type of bag, the tongue 57 is formed integrally with the plate but the free end thereof extends below the bottom edge 58 of the plate and rearwardly of said edge.

A hopper 60 (Figures 6 and 13) for receiving and guiding the frozen confections which have been released from the clips 31 of the belt 30 projects inwardly from the housing 40 of the bag dispenser and has its upper open end in vertical alignment with the point of release of said confections. The hopper has an inclined outer wall 61 opposite the plate 50. An adjusting screw 62 is threaded into a passage in the inclined wall so that the free end of said screw will engage a guide plate 63 which has a hook 64 engaging over the upper edge of the inclined wall 61. The lower end of the guide 63 is bent outwardly to provide an offset 65 from which depends a vertical apron 66. The lower free end of the apron terminates in a horizontal plane passing through the lower end of the magazine 45. The apron is located in spaced relation with the opening 54 in the front face of said magazine. It will be noted that the outer upper edge 67 of each bag when inflated will seat beneath the offset 65 of the guide 63 while the closure flap 47 will be in contact with the tongue 51 of the plate 50. Fingers 68 project inwardly from the side edges of the apron 66 in embracing relation with the side edges of the inflated bag. A bracket 70 extending from the vertical pipe is connected to the hopper 60 for retaining said hopper in a position.

A pipe 71 is in communication with the horizontal pipe 18 at each end thereof and has a downwardly-turned portion 72 forming a nozzle for projecting air into the hoppers 60 and into the bag as shown in Figure 6. It will be noted that the air is directed particularly on to the tongue 51 which forms with the plate 50 a channel for concentrating the air blast into the upper end of the bag.

As shown in Figure 6, the confections inclosed in the bags drop onto the bottom 75 of a container 76 supported by brackets 77 which form the side walls 78 of said container. The rear wall 79 is higher than the side walls for a purpose which will be explained presently. The front of the container opens into an inclined receptacle 80 to receive the bagged confections. The receptacle is supported by the brackets 77.

Means is employed for forcing the package confections from the container 76 into the receptacle 80 (Figures 1 and 6). A presser foot 81 is secured at the lower end thereof to a shaft 82 mounted for rocking movement in the parallel brackets 77. An arm 83 has one end rigid with the shaft 82 while the other end has pivoted connections with a link 84. A lever 85 pivotally connected to the link is rockably mounted at its upper end on an axle 86 carried by each of the vertical pipes 17. The upper free end of each lever is in the form of a finger 90 which is curved around the pipe 18 and adapted to be engaged by a plurality of cams 91 arranged circumferentially on the bottom faces of the pulleys 24 and 25. It must be borne in mind that the mechanism for bagging the confections at one end of the table and disposed below the pulley 25, as shown in Figure 6, is duplicated at the other end of the table below the pulley 24. The presser foot 81 rocks in a slot 75a in the bottom 75 of the container 76.

The operation of my device is as follows:

An operator stands adjacent each end of the table but on opposite sides thereof and in position where he may insert the sticks 33 on the confections 34 between a clip 31 and the belt 30 after the confections have been dipped into a liquid coating in the container 35. In other words the operator who stands adjacent the pulley 25 applies the sticks to the clips 31 on the section 30a of the belt 30 while the operator who is adjacent the pulley applies the sticks to the clips on the section 30c of said belt. One of the operators then moves the belt in the direction indicated by the arrow in Figure 2. When the clips reach the pulleys, the turning of the belt on said pulleys forces the clips outwardly and the sticks and the attached confections are released so that they wil fall into the chutes 60.

Since the motor 21 is operating the blower 20 air will be forced through the pipes 17 and 18 and air will be discharged from the nozzles 72 (Figure 6) into the chutes 60 and along the channels formed by the tongue 51 on the plates 50, thence into the upper end of the bag 48 which is held in an operative position by the tongue 51 at the open end of the magazine 45. The bags will be inflated successively and when the confections are released they will drop into the inflated bags and carry said bags downwardly into the container 76 and rest on the bottom 75 thereof. The presser foot 81 being inclined shifts the packaged confection towards the open end of the container 76.

When the belt is moved in the direction indicated by arrow in Figure 2, the coated confections are carried along straight paths to the discharge ends which are over the chutes 60. The freshly dipped coatings on the confections will have sufficient time to dry before being discharged from the straight paths.

As the pulleys 24 and 25 are revolved by the belt which is manually operated by the attendants, the concentrically arranged cams 91 will engage periodically the fingers 90 on the upper ends of the levers 85 thereby rocking said levers and the arms 83. The presser feet in each container 76 will move outwardly for forcing the packaged confection into the inclined receptacles 80 and said confections will slide downwardly. When the receptacles are filled the confections are transferred to a refrigerator for storage.

While I have described my machine as adapted for bagging chocolate coated frozen confections, it will be appreciated the machine is adapted equally well for bagging plain confections. Such plain confections include frozen ices of different flavors mounted on sticks.

What I claim is:

1. In a machine for drying and bagging chocolate coated frozen confections, a table, a horizontally disposed manifold positioned above and in parallel spaced relation with respect to said table and supported by said table for containing air under pressure, a pair of horizontally disposed pulleys arranged in longitudinal spaced alignment above and spaced from said manifold and each rotatable about a vertical axis, a plurality of cams arranged in circumferential spaced relation about the under face of each of said pulleys, an endless belt trained over and rotatable about said pulleys, a plurality of spring clips arranged exteriorly of and in spaced relation about said belt and each clip having one end fixedly secured to said belt and having the other end free and spaced from the adjacent portion of said belt for receiving a stick carrying a chocolate coated frozen confection, the other end of each of said clips being adapted to move automatically outwardly of said belt upon initiation of the rotational movement of the contiguous portion of said belt about the adjacent pulley to thereby release the stick of the coated confection held therebetween, a vertically disposed bag dispenser provided with a discharge opening in a wall thereof arranged contiguous to each pulley and below said manifold and adapted to support a plurality of upstanding abutting bags having the flap closures facing upwardly and to successively feed said bags to said discharge opening, a hopper positioned adjacent the discharge opening wall of said dispenser and having its lower end in communication with the discharge opening of said dispenser and having its upper end positioned for receiving a stick of frozen confection upon release from its holding clip, a pipe having one end connected to said manifold and having the other end directed into the upper end of said hopper for introducing a stream of air against the discharge opening of said dispenser and into the flap closure end of the bag within said hopper to cause inflation of said bag, an upstanding container positioned below and in alignment with the lower end of the hopper for receiving the bag containing a stick of frozen confection, said container including an upstanding rear wall and an open front wall and having a bottom provided with a slot, a presser foot projecting upwardly through the slot in said container bottom and connected to said container for rocking movement toward and away from the open front wall of said container, an inclined receptacle positioned below and in alignment with the open front wall of said first container for receiving the bag containing a stick of frozen confection, and means operatively connected to said presser foot and engaging one cam at a time in successive order upon rotational movement of the latter for effecting the movement of said presser foot toward the open front wall of said first container to thereby discharge the bag containing the frozen confection into said second container.

2. In a machine for drying and bagging chocolate coated frozen confections, a table, a horizontally disposed manifold positioned above and in parallel spaced relation with respect to said table and supported by said table for containing air under pressure, a pair of horizontally disposed pulleys arranged in longitudinal spaced alignment above and spaced from said manifold and each rotatable about a vertical axis, a plurality of cams arranged in circumferential spaced relation about the under face of each of said pulleys, an endless belt trained over and rotatable about said pulleys, a plurality of spring clips arranged exteriorly of and in spaced relation about said belt and each clip having one end fixedly secured to said belt and having the other end free and spaced from the adjacent portion of said belt for receiving a stick carrying a chocolate coated frozen confection, the other end of each of said clips being adapted to move automatically outwardly of said belt upon initiation of the rotational movement of the contiguous portion of said belt about the adjacent pulley to thereby release the stick of the coated confection held therebetween, a vertically disposed bag dispenser provided with a discharge opening in a wall thereof arranged contiguous to each pulley and below said manifold and adapted to support a plurality of upstanding abutting bags having the flap closures facing upwardly and to successively feed said bags to said discharge opening, a hopper positioned adjacent the discharge opening wall of said dispenser and having its lower end in communication with the discharge opening of said dispenser and having its upper end positioned for receiving a stick of frozen confection upon release from its holding clip, a pipe having one end connected to said manifold and having the other end directed into the upper end of said hopper for introducing a stream of air against the discharge opening of said dispenser and into the flap closure end of the bag within said hopper to cause inflation of said bag, an upstanding container positioned below and in alignment with the lower end of the hopper for receiving the bag containing a stick of frozen confection, said container including an upstanding rear wall and an open front wall and having a bottom provided with a slot, a presser foot projecting upwardly through the slot in said container bottom and connected to said container for rocking movement toward and away from the open front wall of said container, an inclined receptacle positioned below and in alignment with the open front wall of said first container for receiving the bag containing a stick of frozen confection, an upstanding lever pivotally connected intermediate its ends to said manifold and having the lower end operatively connected to the lower end of said presser foot, and a finger on the upper end of said lever and engaging one cam at a time in successive order upon rotational movement of the latter for effecting the movement of said presser foot toward the open front wall of said first container to thereby discharge the bag containing the frozen confection into said second container.

EDWARD TOMUSKO.

REFERENCES CITED

The following references are of record in the file of this patent:

UNITED STATES PATENTS

| Number | Name | Date |
|---|---|---|
| 237,074 | Baldwin | Jan. 25, 1881 |
| 1,132,713 | Francisco | Mar. 23, 1915 |
| 1,139,292 | Jirotka | May 11, 1915 |
| 1,600,320 | Danquigney | Sept. 21, 1926 |
| 1,960,456 | Robb | May 29, 1934 |
| 2,020,415 | Hirsch | Nov. 12, 1935 |
| 2,045,678 | Shafer | June 30, 1936 |
| 2,069,266 | Nicodemus | Feb. 2, 1937 |
| 2,173,409 | Chandler | Sept. 19, 1939 |
| 2,336,213 | Bayer et al. | Dec. 7, 1943 |
| 2,355,500 | Anderson | Aug. 8, 1944 |